US008814006B2

(12) United States Patent
Villarreal

(10) Patent No.: US 8,814,006 B2
(45) Date of Patent: Aug. 26, 2014

(54) SYSTEM AND METHOD FOR FLAVORING FOOD

(76) Inventor: Jose A. Villarreal, Mabank, TX (US)

( * ) Notice: Subject to any disclaimer, the term of this patent is extended or adjusted under 35 U.S.C. 154(b) by 0 days.

(21) Appl. No.: 13/577,899

(22) PCT Filed: Feb. 8, 2011

(86) PCT No.: PCT/US2011/024105
§ 371 (c)(1),
(2), (4) Date: Aug. 8, 2012

(87) PCT Pub. No.: WO2011/097645
PCT Pub. Date: Aug. 11, 2011

(65) Prior Publication Data
US 2012/0305592 A1    Dec. 6, 2012

(51) Int. Cl.
G01F 11/00 (2006.01)
(52) U.S. Cl.
USPC ............ 222/216; 222/223; 222/225; 222/241
(58) Field of Classification Search
CPC ..... A21C 15/002; A23P 1/082; A23L 1/0032; G01F 11/22; G01F 11/24; A23G 3/2076; A01C 15/16
USPC ................. 222/148, 235–236, 240–241, 333, 222/216–225; 99/494
See application file for complete search history.

(56) References Cited

U.S. PATENT DOCUMENTS 2,075,050 A * 3/1937 Nowinski ....................... 222/108
2,601,608 A * 6/1952 Hansen .......................... 222/413
3,087,444 A * 4/1963 Ferguson et al. .............. 111/74
3,190,506 A * 6/1965 Selzler .......................... 222/314
3,203,599 A * 8/1965 Renner ......................... 222/196
3,231,261 A * 1/1966 Huffman ......................... 270/4
3,656,518 A * 4/1972 Aronson ........................ 141/1
3,664,550 A * 5/1972 Carothers et al. .......... 222/129.2

(Continued)

FOREIGN PATENT DOCUMENTS

WO    WO 9714635 A1 *  4/1997  ............ B65G 45/16

OTHER PUBLICATIONS

Blade—Definition and More from the Free Merriam-Webster Dictionary.*

(Continued)

Primary Examiner — Paul R Durand
Assistant Examiner — Randall Gruby
(74) Attorney, Agent, or Firm — Kirby B. Drake; Klemchuk Kubasta LLP

(57) ABSTRACT

A system and method of flavoring food includes a metering tray coupled to a frame. The metering tray may be configured to hold a food flavoring. A metering roller also may be coupled to the frame. An exterior axial surface of the metering roller may define a plurality of indentations, which may be configured to capture the food flavoring as the metering roller rotates. The system may also include a metering blade and a displacement; each may be coupled to the frame. The metering blade may be configured to level the food flavoring as the food flavoring is dispensed by the plurality of indentations of the metering roller as the metering roller rotates. The displacement blade may have a plurality of teeth that are configured to correspond to the plurality of indentations. The teeth may be configured to positively displace the food flavoring as the metering roller rotates.

17 Claims, 8 Drawing Sheets

(56) References Cited

U.S. PATENT DOCUMENTS

| | | | |
|---|---|---|---|
| 3,767,089 A * | 10/1973 | McKee et al. | 222/221 |
| 3,774,814 A * | 11/1973 | Vidjak | 222/220 |
| 3,913,791 A * | 10/1975 | Sollerud | 222/139 |
| 4,392,587 A | 7/1983 | Bourne | |
| 4,493,442 A * | 1/1985 | Hanson, Jr. | 222/241 |
| 4,556,323 A * | 12/1985 | Elkin | 366/31 |
| 4,655,161 A * | 4/1987 | Thompson | 118/24 |
| 4,666,069 A * | 5/1987 | Morine et al. | 222/368 |
| 4,671,430 A * | 6/1987 | Dinius | 222/135 |
| 4,684,040 A * | 8/1987 | Jonovic et al. | 222/148 |
| 4,964,535 A * | 10/1990 | Curwen | 222/67 |
| 5,016,746 A * | 5/1991 | Gibbs | 198/499 |
| 5,178,677 A * | 1/1993 | Haas et al. | 118/25 |
| 5,189,965 A | 3/1993 | Hobbs et al. | |
| 5,386,939 A | 2/1995 | Ruegg | |
| 5,706,742 A * | 1/1998 | Hamrick | 110/286 |
| 5,846,324 A | 12/1998 | Marshall et al. | |
| 6,206,141 B1 * | 3/2001 | Bond | 185/27 |
| 6,240,861 B1 * | 6/2001 | Memory | 111/178 |
| 6,598,548 B2 * | 7/2003 | Lempriere | 111/178 |
| 6,871,762 B1 * | 3/2005 | Cripps | 222/142.3 |
| 6,962,128 B2 | 11/2005 | Dove et al. | |
| 7,017,463 B1 * | 3/2006 | Simpson | 83/117 |
| 7,284,679 B2 | 10/2007 | Zill et al. | |
| 7,343,868 B2 * | 3/2008 | Stephens et al. | 111/178 |
| 7,624,771 B2 * | 12/2009 | Parks et al. | 141/67 |
| 8,220,657 B2 * | 7/2012 | Cicognani | 221/7 |
| 2007/0175773 A1 * | 8/2007 | Spellman | 206/162 |
| 2007/0245952 A1 * | 10/2007 | Ryan et al. | 118/308 |
| 2009/0047393 A1 | 2/2009 | Jones | |

OTHER PUBLICATIONS

PCT International Search Report and Written Opinion dated Mar. 30, 2011 for corresponding PCT Application No. PCT/US/11/24105 (8 pages).

* cited by examiner

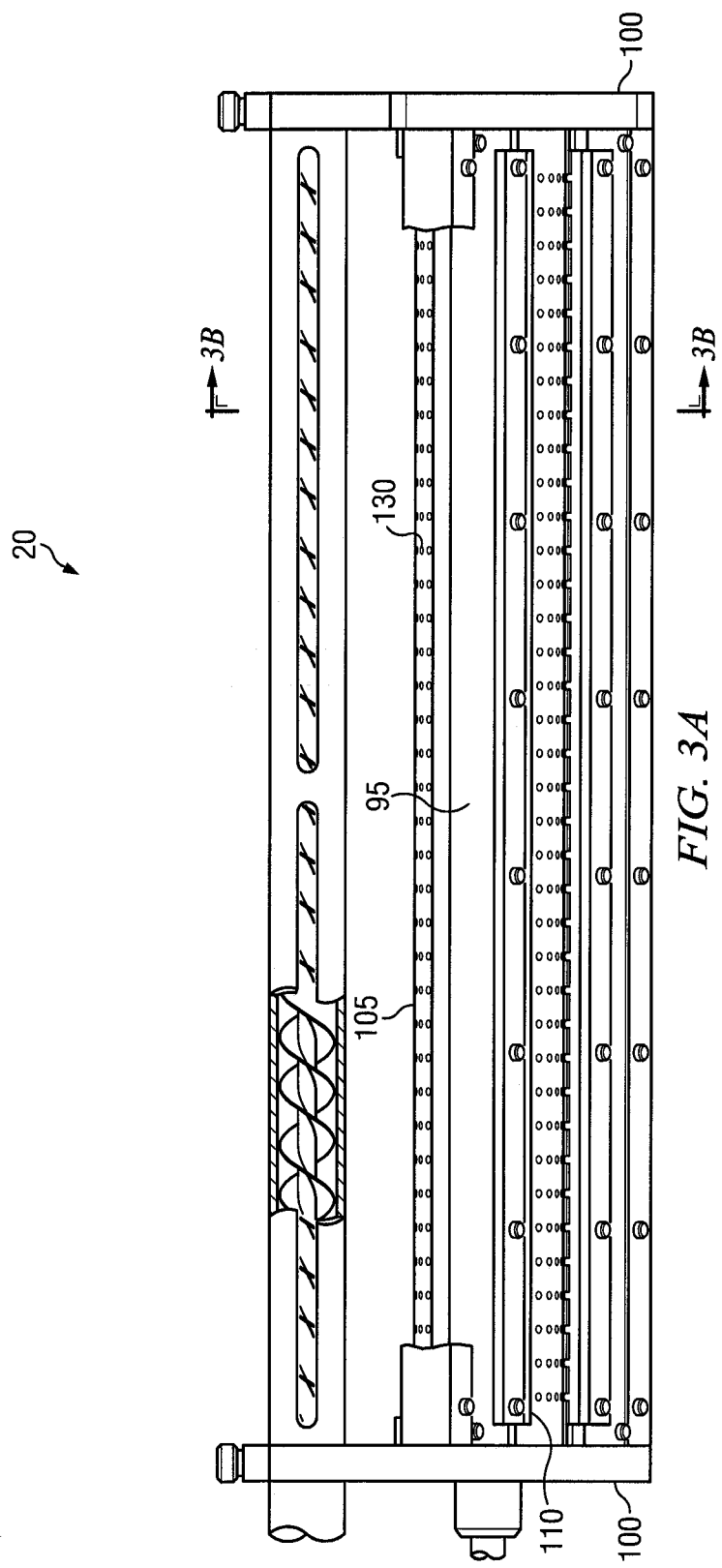

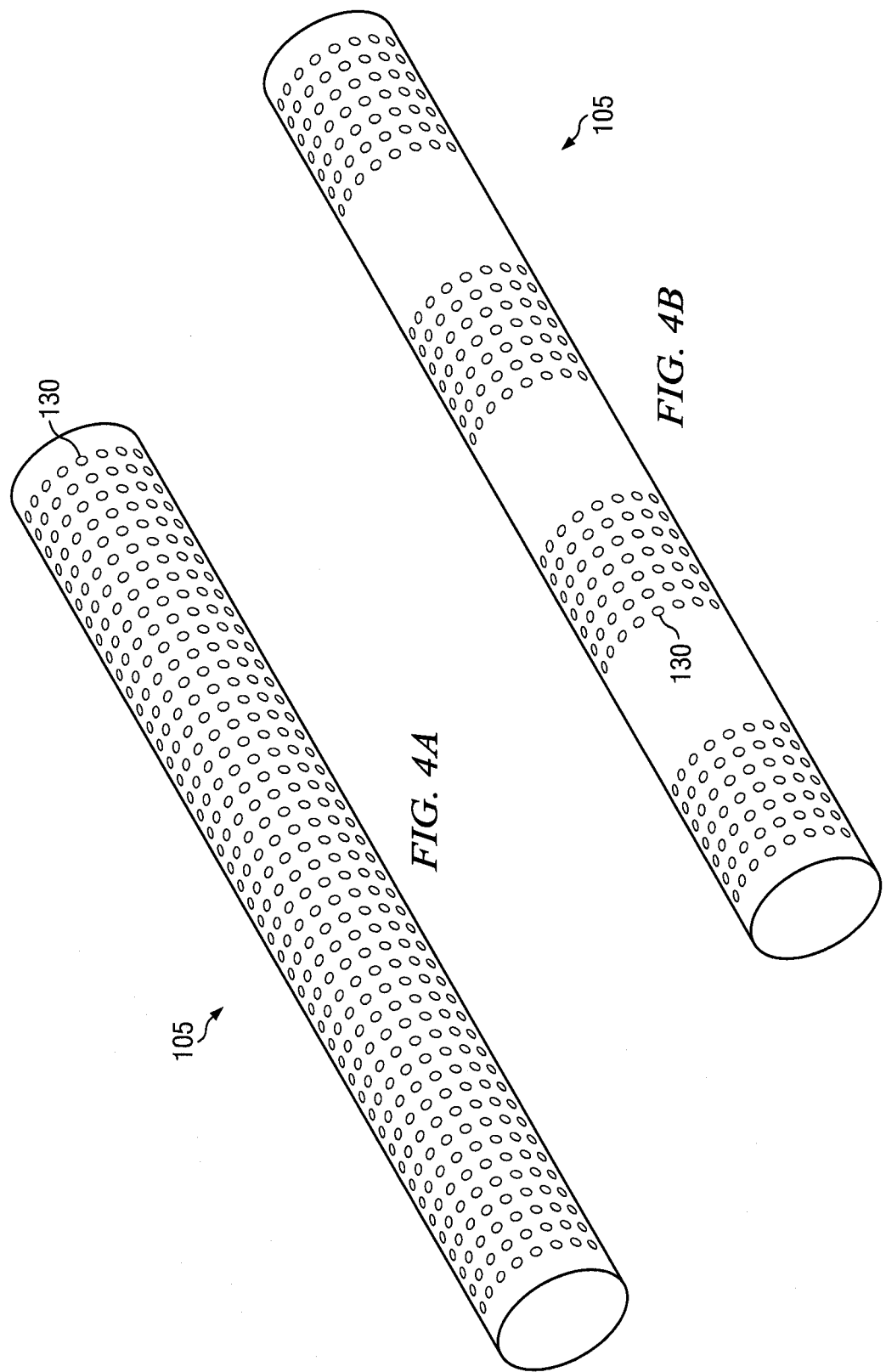

SYSTEM AND METHOD FOR FLAVORING FOOD

This application is a U.S. national phase application of International Application No. PCT/US2011/024105, filed Sep. 8, 2011, designating the United States, which claims the benefit of U.S. Appl. No. 61/302,446, filed Feb. 8, 2010, the contents of which is are incorporated herein by reference in its their entireties.

TECHNICAL FIELD

The present disclosure generally relates to flavoring food, and more particularly to systems and methods for applying a controlled amount of flavoring to snack foods.

BACKGROUND

Many commercially available snack food items include seasonings or other toppings of one form or another deposited upon their surfaces. Examples of such snack foods include potato chips, which can be seasoned with salt, barbecue flavoring, sour cream and onion flavoring, cheese-based toppings, etc. Corn chips and other snack food items, such as pretzels, corn puffs and popcorn, can be similarly seasoned. In addition to the savory snack food items just described, sweet snacks commonly are topped with powdered and granular sugars, decorative toppings, and the like.

Toppings can be applied to snack food items in a variety of ways, for example the topping may be dispensed onto snack food items, which are tumbling in a rotating drum. The tumbling action of the snack food items aids in the even distribution of the topping over the entire contents of the drum.

Commonly used savory snack food seasonings and toppings exhibit a variety of physical properties, which govern their behavior during the dispensing operation. Flour salt, the finely powdered salt used as a topping for potato chips, is extremely dry and free flowing. Thus, this topping tends to rapidly pass through dispensing equipment, and its flow must be carefully metered and regulated to avoid over-salting the snack food product. Sour cream and onion toppings (as well as cheese-based, dairy-based, and oil-based toppings in general) are relatively moist and tend to resist free flow through dispensing equipment. These relatively "clumpy" or "sticky" toppings tend to clog dispensing apparatus and are prone to intermittent, uneven flow.

Thus, one important attribute of a topping dispensing equipment is the ability to dispense, in a controlled, evenly regulated manner, both free-flowing and sticky toppings. The even distribution of seasoning and toppings is important to many aspects of the snack food production process. First, even distribution is essential to providing a uniform appearing and tasting product. Further, uneven or wasteful topping dispensing can adversely impact the economy of the manufacturing process. Finally, over-topped and under-topped items may need to be discarded to avoid inconsistencies in the final, packaged product.

SUMMARY

Embodiments of the present disclosure generally provide a system and method of flavoring food, for example snack food. The system may include a metering tray coupled to a frame. The metering tray may be configured to hold a food flavoring. A metering roller also may be coupled to the frame. An exterior axial surface of the metering roller may define a plurality of indentations, which may be configured to capture the food flavoring as the metering roller rotates. The system may also include a metering blade and a displacement; each may be coupled to the frame. The metering blade may be configured to level the food flavoring as the food flavoring is dispensed by the plurality of indentations of the metering roller as the metering roller rotates. The displacement blade may have a plurality of teeth that are configured to correspond to the plurality of indentations. The teeth may be configured to positively displace the food flavoring as the metering roller rotates.

An embodiment of a method for flavoring food includes depositing a food flavoring into a metering tray. A plurality of indentations may capture the food flavoring. The plurality of indentations may be defined by an exterior axial surface of a metering roller. The food flavoring may be dispensed onto a food product from the plurality of indentations as the metering roller rotates beyond a metering blade. The metering blade may be configured to level the food flavoring. The food flavoring may also be dispensed from the plurality of indentations using a displacement blade having a plurality of teeth. The plurality of teeth may correspond to the plurality of indentations.

In one embodiment, the systems and methods of the present disclosure allow consistent application of food flavoring to a food product. The amount of food flavoring can be precisely controlled by controlling the rotational speed of the metering roller in accordance with embodiments of the present disclosure.

In addition, sticky food flavoring may be applied without the use of a flow agent, and embodiments of the present disclosure may substantially reduce waste of food flavoring.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 3A-3D are illustrations of the seasoning applicator shown in FIG. 1 according to an embodiment of the present disclosure;

FIGS. 4A-4B are alternate embodiments of the metering roller according to embodiments of the present disclosure.

DETAILED DESCRIPTION

The present disclosure generally provides systems and methods that may be used in a variety of food flavoring applications. For example, sugar or other types of toppings may be applied to cereal, and toppings may be applied to bakery items, such as bread, cookies, crackers, and the like, consistent with the teaching of the present disclosure. Also, the amount of seasoning applied to snack foods can be precisely controlled, in part, by adjusting the rotational velocity of a metering roller in accordance with the teachings of the present disclosure.

It should be understood that the diagrams and flow charts shown in FIGS. 1-5 are for illustrative purposes only and that any other suitable systems or methods could be used in conjunction with or in lieu of the illustrated diagrams and flow charts according to embodiments of the present disclosure.

Figure 1:
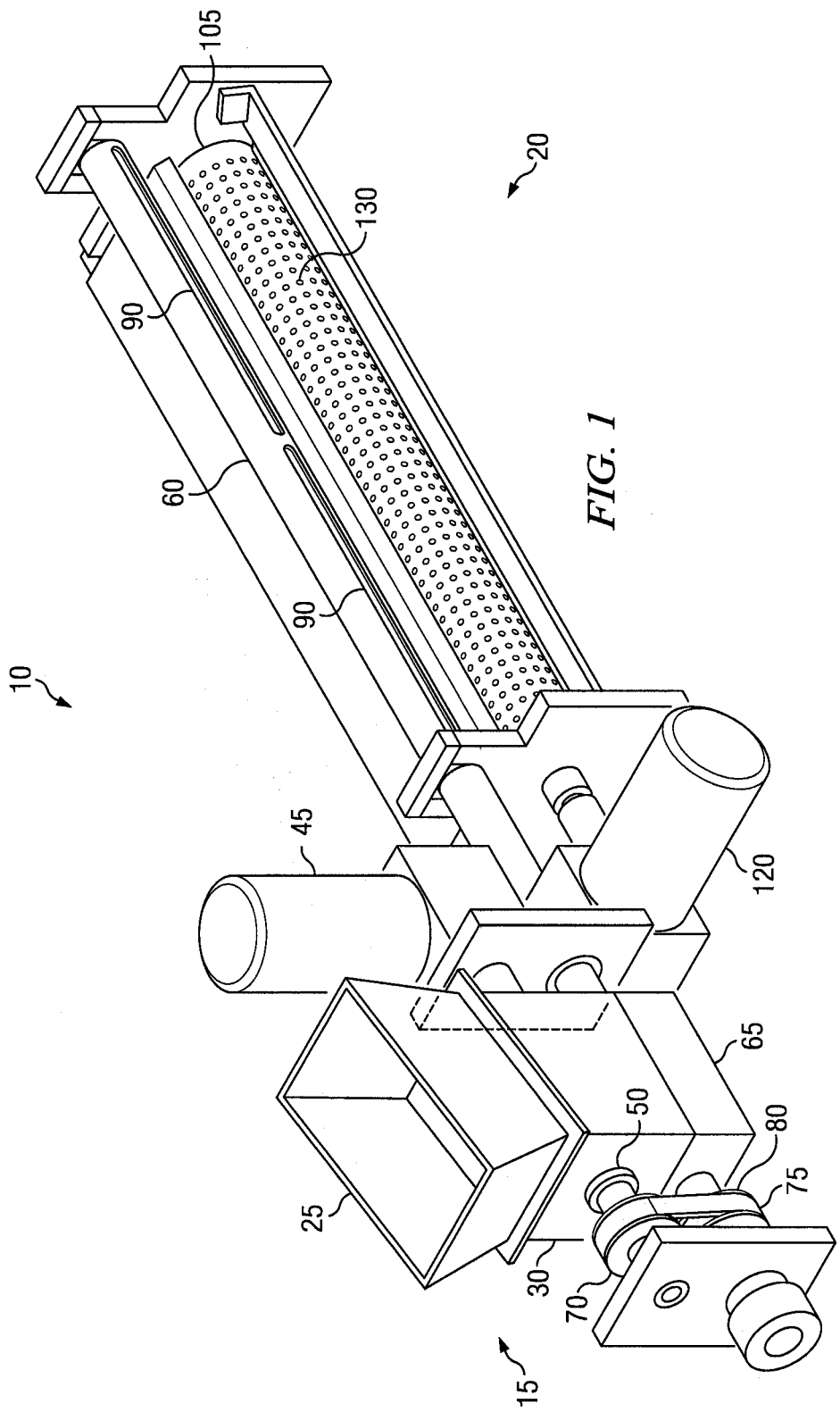
FIG. 1 is an isometric view of a seasoning system according to an embodiment of the present disclosure.

Referring to the drawings, and particularly to FIG. 1, a seasoning system 10 is shown. The seasoning system 10 may be used to apply a variety of different seasonings to a variety of different types of foods. For example, seasoning system 10 may be used to apply dry seasoning, such as salt, to potato chips. The seasoning system 10 may also be used to apply lactose-based seasonings, such as cheese, sour cream, French onion, etc., to potato chips or snack foods. The seasoning system 10 may also be used to apply sweet flavoring to sweeter snack foods.

The seasoning system 10 may include a seasoning feeder 15 and a seasoning applicator 20. The seasoning feeder 15 may include a hopper 25. The hopper 25 may hold the seasoning to be fed to the seasoning applicator 20. The hopper 25 may also include a low level sensor that indicates when the hopper 25 is low on seasoning and needs to be refilled to ensure uninterrupted operation of the seasoning system 10. In certain embodiments, the low level indicator may trigger an automatic filling operation to refill the hopper 25 with seasoning. In other embodiments, the low level indicator may trigger a manual refilling operation. In operation, gravity may act to move the seasoning from the hopper 25 into a dispenser 30, which is coupled to the hopper 25. In certain embodiments, the hopper 25 may be easily removed from the dispenser 30 for cleaning, maintenance, repairs, etc.

Figure 2:
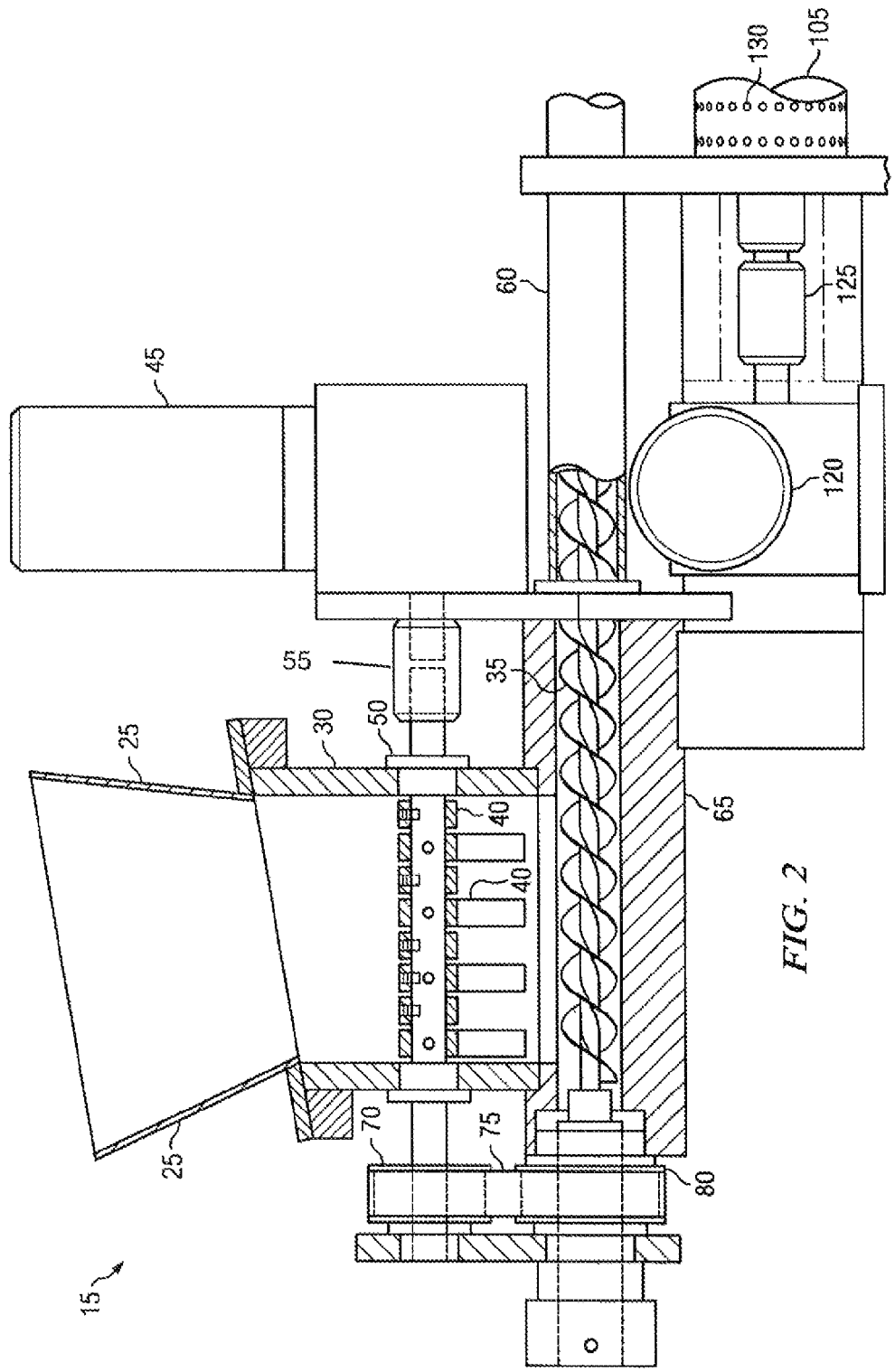
FIG. 2 is a cross-sectional view of a portion of the seasoning system shown in FIG. 1.

As shown in FIG. 2, the dispenser 30 may prepare the seasoning to be passed to the seasoning applicator 20. While the seasoning is in the dispenser 30, paddles 40 may act on it. The paddles 40 may be coupled to a drive shaft 50 that may be driven by a feeder motor 45. A feeder coupling 55 may couple the drive shaft 50 to the feeder motor 45 and allow the power of the feeder motor 45 to be transferred to the drive shaft 50. The speed at which the paddles 40 rotate through the seasoning may be adjusted by changing the speed of the feeder motor 45. The paddles 40 may break-up any clumping in the seasoning. Clumping of the seasoning may be referred to as bridging of the seasoning, and it may be caused by moisture retained by the seasoning or that the seasoning has accumulated in the hopper 25 and/or the dispenser 30. The paddles 40 may also be angled toward an exit port of the dispenser 30 such that the motion of the paddles 40 directs the seasoning toward the exit port.

A base 65 may also be coupled to the dispenser 30. The base 65 may be made of non-metallic material to reduce wear, and it may mount to the dispenser 30 using one or more quick disconnect couplers. The base 65 may be easily removed from the seasoning feeder 15 to allow the hopper 25 and the dispenser 30 to be evacuated. Once the seasoning is removed, the hopper 25 and the dispenser 30 may then easily be cleaned.

The motor 45 may also drive an auger 35. In an alternate embodiment, one motor may drive the auger 35, and a second motor may drive the paddles 40. The drive shaft 50 may be coupled to drive sprockets 70, which transfer power from the drive shaft 50 to a drive belt 75, which in turn transfers the power to a drive sleeve 80. The drive sleeve 80 may be coupled to the auger 35 by any suitable method, for example a quick connect. Coupling using a quick connect may allow the auger 35 to be disconnected without using tools. This may facilitate easy removal of the auger 35 for cleaning and changing seasoning. The rotational speed of the auger 35 may be increased or decreased depending on the seasoning delivery needs of the particular application.

The auger 35 may receive seasoning fed through the hopper 25, operated on by the paddles 40 and moved through an exit port of the dispenser 30. The seasoning may travel on the auger 35 through a distribution tube 60. The distribution tube 60 may have one or more slots 90 that allow a certain amount of seasoning to fall through. The slots 90 may be oriented at an angle that allows an even flow of seasoning to be dispensed throughout the length of the distribution tube 60. In some embodiments, the slots 90 may be located such that the seasoning may be dispensed through the bottom of the dispenser 30. In other embodiments, the slots 90 may be located between five and eight degrees from the bottom of the dispenser 30 in the direction of rotation of the auger 35. In accordance with an embodiment of the present disclosure, the seasoning may fall through the slots 90 and be received by the seasoning applicator 20, where the seasoning applicator 20 may evenly and completely coat a snack food with the seasoning.

FIGS. 3A-3D illustrate the seasoning applicator 20 according to an embodiment of the present disclosure. The seasoning applicator 20 may include a metering tray 95. The metering tray 95 may be located underneath the distribution tube 60, such that it receives the seasoning that is dispensed through the slots 90 of the distribution tube 60. The metering tray 95 may be coupled to a frame 100 and may also serve to clamp in place a metering blade 110. The frame 100 may also support a metering roller 105, and in some embodiments, a displacement blade 115.

An applicator motor 120 may be coupled to the metering roller 105 using an applicator coupling 125. The applicator motor 120 may control the rotation of the metering roller 105, and thereby control the amount of seasoning that ultimately reaches the snack food product below the metering roller 105.

Figure 3B:
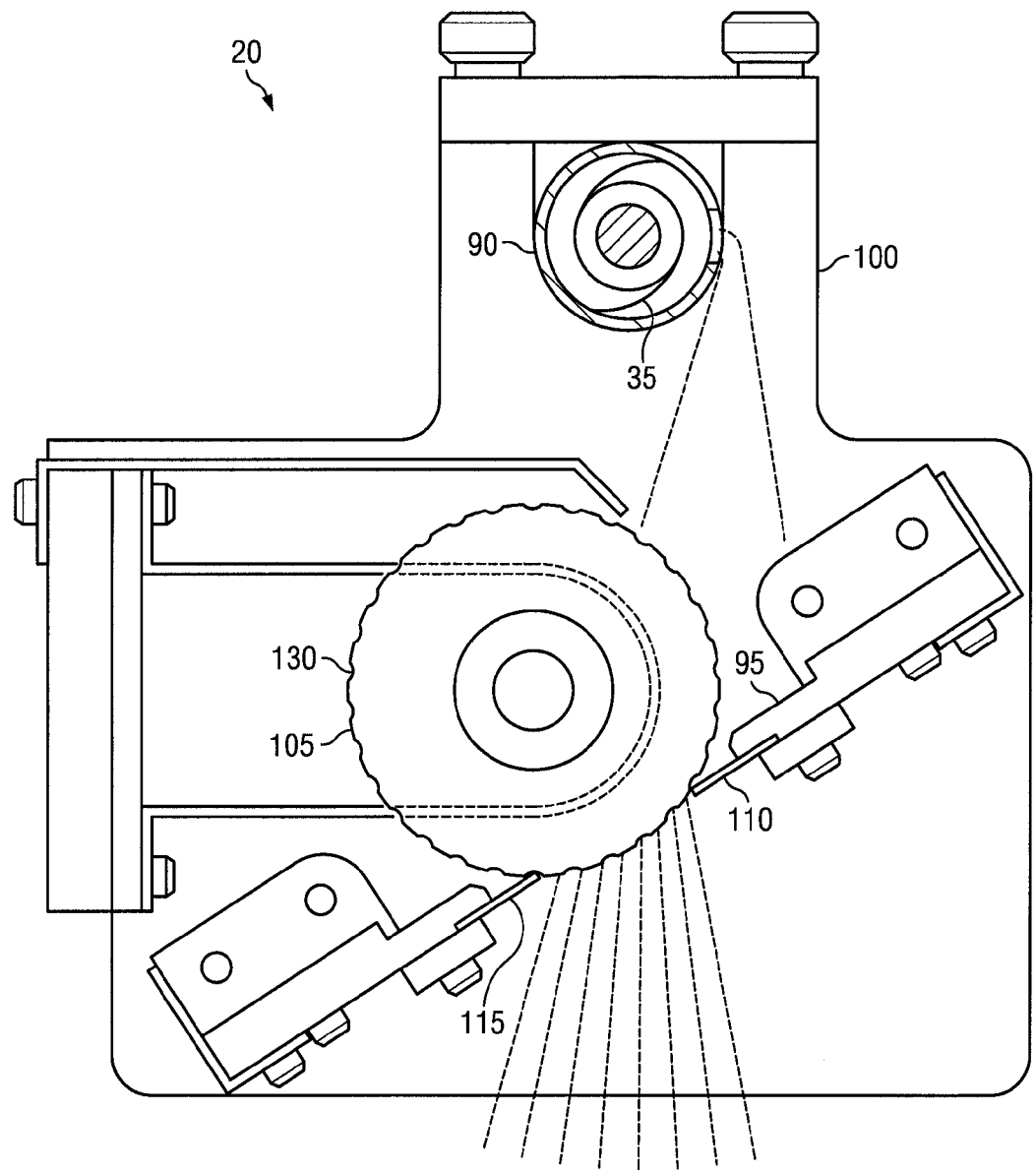
Figure 3C:
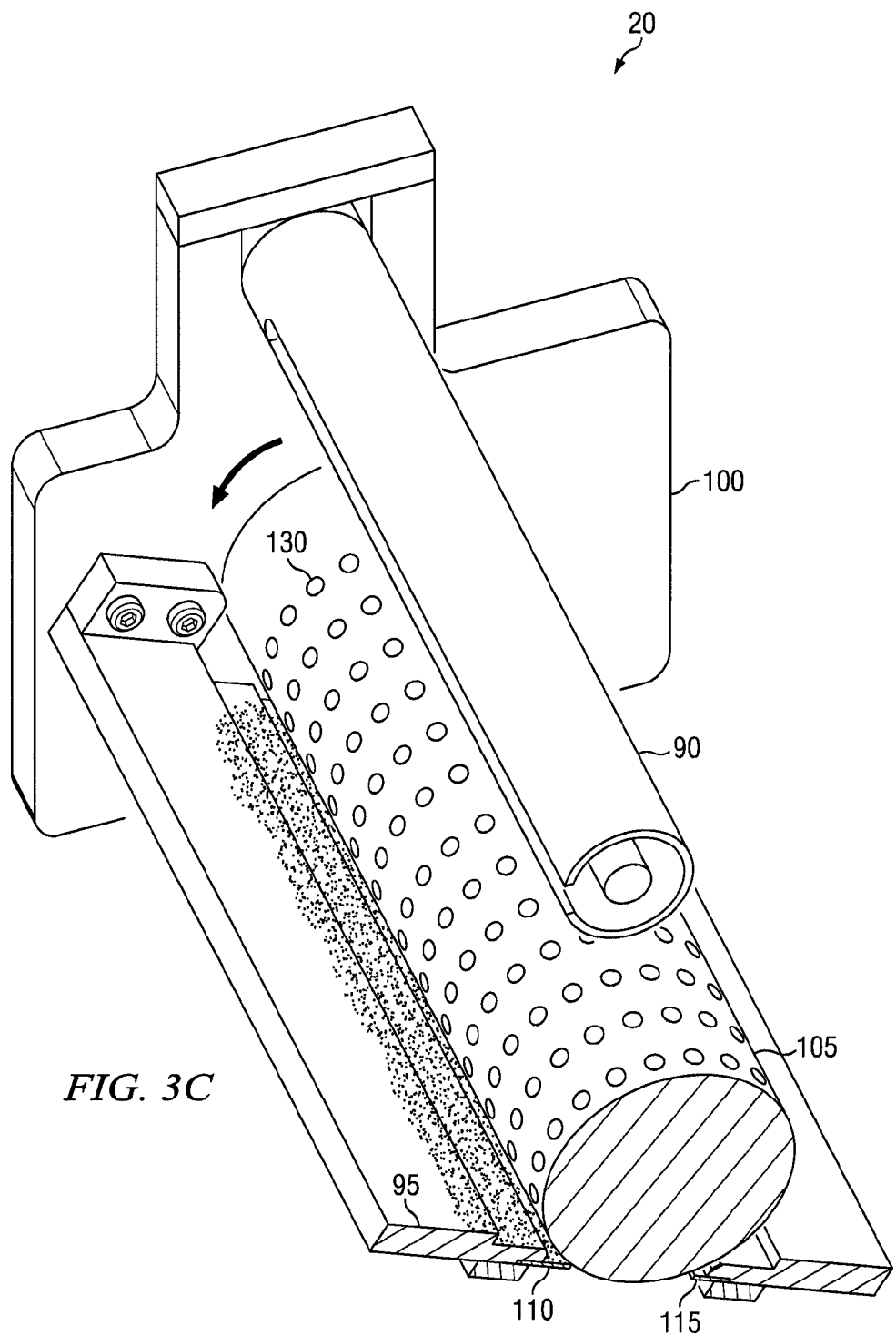

As shown in FIGS. 3B and 3C, which are enlarged views of a portion of the seasoning applicator 20, the metering roller 105 may rotate against the metering blade 110. The metering blade 110 may be oriented at a particular angle with respect to the metering roller 105, for example the metering blade 110 may be oriented between 30 and 35 degrees from horizontal. This may ensure that the metering roller 105 dispenses the seasoning once the metering roller 105 has rotated past the metering blade 110, and gravity acts to cause the seasoning contained in indentations 130 in the metering roller 105 to fall to the product below. The metering blade 110 may be made of a flexible non-metallic material, such as rubber. In addition, the pressure the metering blade 110 exerts on the metering roller 105 may be increased or decreased depending on the application. In some embodiments, the pressure the metering blade 110 exerts on roller 105 may be sufficient to ensure leveling of the seasoning in the indentations 130. Additional pressure may be applied, but this may result in slightly increased wear on the metering blade 110. Pressure adjustments may be done through visual inspection of the interaction of the metering blade 130 with the roller 105.

The metering roller 105 may be made of polished metal and may be coated with a hard industrial food grade anodized surface. This may increase the metering roller's 105 resistance to wear and may also result in less friction between the metering roller 105 and the metering blade 110. The metering roller 105 may also include various patterns of indentations 130 (see FIGS. 4A and 4B). In the embodiment shown, the indentations 130 are oriented to ensure a proper angle to release the seasoning onto the snack food below. For example, the release angle of the seasoning may be between 135 and 160 degrees.

In operation, the applicator coupling 125 transfers the power of the applicator motor 120 to the metering roller 105 causing it to rotate (see FIG. 2). As the metering roller 105 rotates, it rotates through the seasoning that has collected in the metering tray 95, and the indentations 130 in the metering roller 105 fill with the seasoning. As the metering roller 105 continues to rotate, the filled indentations 130 pass by the metering blade 110, which levels the seasoning and prevents excess seasoning from falling on the snack food product below. Thus, this excess seasoning remains in the metering tray 95. The metering blade 110 ensures that only the seasoning that has been captured by the indentations 130 pass it and is deposited on the product below. This may ensure a precise measurement of seasoning that can be consistently applied. Also, only the necessary seasoning is dispensed, so seasoning waste may be significantly reduced. Because each indentation 130 holds a precise and measurable amount of seasoning and the number of indentations 130 in the metering roller 105 is known, an accurate amount of seasoning dispensed per revolution of the metering roller 105 may be calculated. Thus, depending on the particular application, the amount of seasoning applied to the product may be accurately controlled by increasing or decreasing the rotational speed of the metering roller 105. The applicator motor 120 may control the rotational speed of the metering roller 105, and the applicator motor 120 may be controlled by a potentiometer. This precise control may reduce or eliminate guesswork or a catch test that may be required with conventional seasoning systems.

The number of indentations 130 and their depth may control the amount of seasoning that is dispensed. In the embodiment shown, the orientation of the indentations 130 may cause a curtain-like flow of seasoning onto the product. In alternate embodiments, the depth and/or the diameter of the indentations 130 may be modified consistent with the teachings of the present disclosure to allow more or less seasoning to be deposited on the snack food. For example, as shown in FIG. 4B, the indentations 130 may be spaced apart a certain distance, such that there may be a break in the curtain-like flow of the seasoning, where no seasoning is dispensed. Thus, there may be a column-like flow of seasoning in this embodiment. Any configuration of indentations in the metering roller 105 suitable for the particular application may be used in accordance with the teachings of the present disclosure.

Figure 3D:
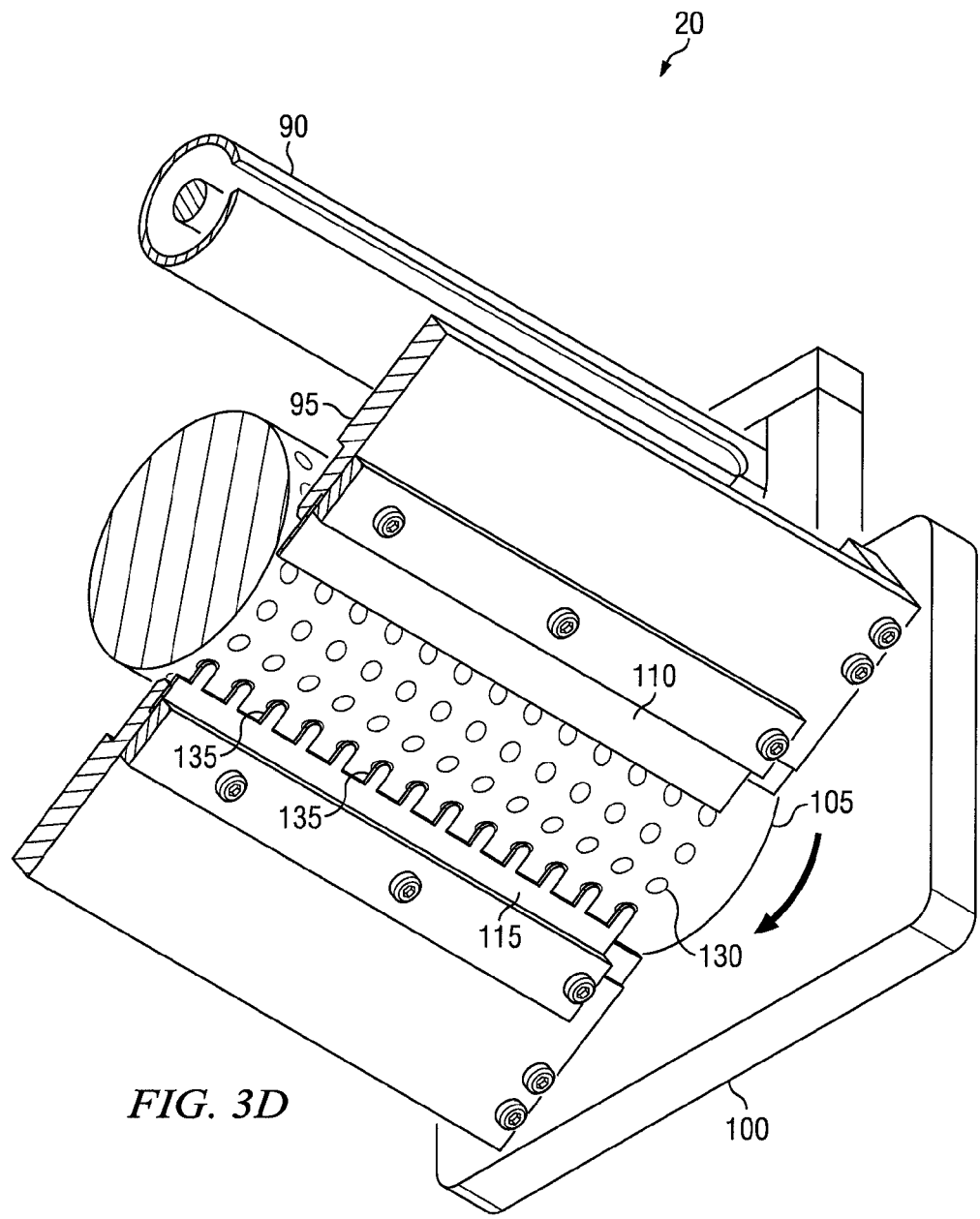

As shown in the embodiment illustrated in FIG. 3D, the metering roller 105 may also rotate against a displacement blade 115. The displacement blade 115 may be oriented approximately 180 degrees from the metering blade 110, such that the indentations 130 in metering roller 105 may encounter the displacement blade 115 after the indentations 130 have rotated past the metering blade 110 and may have deposited some of their contents on the product. In certain applications, certain seasoning such as cheese, sour cream, French onion, and others may have a consistency that causes it to stick to the roller, such that the rotation of the metering roller 105 and gravity may not dispense all of the seasoning. These seasonings may be at least partially lactose based. Conventional seasoning systems often use flow agents to dispense this type of seasoning. However, in accordance with an embodiment of the present disclosure, the displacement blade 115 may dispense seasoning with the above-described consistency without the need of a flow agent.

The displacement blade 115 may include a plurality of teeth 135. The teeth 135 may correspond to the indentations 130 in the metering roller 105. That is, the teeth 135 may have a width that is equal to the diameter of the indentations 130 and may be located such that each tooth 135 can mesh with a corresponding indentation 130. Thus, when the indentations 130 encounter the displacement blade 115, the teeth 135 positively displace the remaining seasoning from the indentations 130. This displaced seasoning can then fall on the product below.

Figure 5:
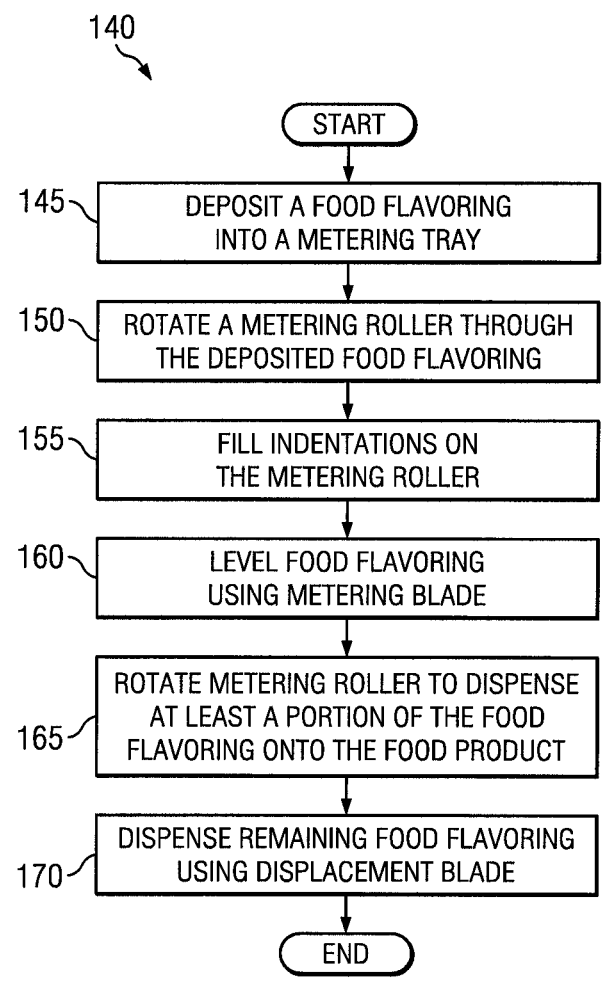
FIG. 5 is a flow diagram illustrating a method of flavoring food in accordance with embodiments of the present disclosure.

FIG. 5 is a somewhat simplified flow diagram illustrating a method 140 of flavoring food, for example snack food. It should be understood that the method 140 shown in FIG. 5 is for illustrative purposes only and that any other suitable method or sub-method could be used in conjunction with or in lieu of the method 140 according to an embodiment of the present disclosure. It should also be understood that the steps of method 140 could be performed in any suitable order or manner.

The method 140 begins at step 145 where a food flavoring, such as seasoning for a snack food is deposited on the metering tray 95. As described above, the food flavoring may enter the seasoning system 10 through the hopper 25, pass through the seasoning feeder 15 and be transported by the auger 35 where it can pass through the slots 90 and fall into the metering tray 95. At step 150, the metering roller 105 rotates through the food flavoring that has been deposited in the metering tray 95. By rotating the metering roller 105 through the food flavoring, the indentations 130 in the metering roller 105 can capture the food flavoring and fill the indentations 130, at step 155.

At step 160, the metering blade 110 levels the food flavoring in the indentations 130 by preventing the excess food flavoring from moving past the metering blade 110. This leveling action may ensure that a precise amount of food flavoring is captured by the indentations 130, and that precise amount can be deposited on the food product. As the metering roller 105 continues to rotate past the metering blade 110, the food flavoring in the indentations 130 may be dispensed onto the food product below, at step 165.

In certain embodiments, some or all of the food flavoring may stick to the walls of the indentations 130, such that less than all of the food flavoring is dispensed once the metering roller 105 rotates past the metering blade 110. In this case, the remaining food flavoring in the indentations 130 can be dispensed onto the food product by the teeth 135 of the displacement blade 115, at step 170, and the method ends. After the food flavoring is dispensed from the particular indentations 130, the same indentations 130 may continue to rotate and be filled with food flavoring that is in the metering tray 95, and the dispensing process repeats.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods and alterations, permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for flavoring food, comprising:
    a metering tray coupled to a frame and configured to hold a food flavoring;
    a metering roller coupled to the frame, the metering roller having an exterior axial surface defining a plurality of indentations, the plurality of indentations being configured to capture the food flavoring as the metering roller rotates the plurality of indentations through the metering tray;
    a metering blade coupled to the frame, the metering blade configured to level the captured food flavoring as the metering roller rotates and before the leveled food flavoring is dispensed from the plurality of indentations; and
    a displacement blade coupled to the frame, the displacement blade comprising a plurality of teeth configured to correspond to the plurality of indentations.

2. The system of claim 1, the displacement blade oriented at an angle of about 180 degrees relative to the metering blade.

3. The system of claim 1, the metering blade oriented at an angle between about 30 and about 35 degrees relative to a horizontal plane.

4. The system of claim 1, further comprising:
    an applicator motor configured to control a rotational speed of the metering roller to control an amount of food flavoring dispensed.

5. The system of claim 1, wherein a pressure applied by the metering blade against the metering roller is variable.

6. The system of claim 1, wherein the metering blade is formed of a flexible non-metallic material.

7. The system of claim 1, wherein the metering blade is formed of rubber.

8. The system of claim 1, wherein the metering roller is formed of a polished metallic material.

9. The system of claim 8, wherein the metering roller is coated with a hard industrial food grade anodized surface.

10. The system of claim 1, wherein the plurality of indentations is configured in a pattern corresponding to a desired location and volume of dispensed food flavoring.

11. The system of claim 10, wherein the pattern of the plurality of indentations comprises a first plurality of indentations at a proximal end of the metering roller and a second plurality of indentations at a distal end of the metering roller.

12. The system of claim 10, wherein the pattern of the plurality of indentations comprises a first plurality of indentations and a second plurality of indentations separated by a longitudinal space along the metering roller.

13. The system of claim 10, wherein each of the plurality of indentations defines a release angle between an interior wall of the indentation and the exterior axial surface of the metering roller, and wherein the release angle of at least one of the plurality of indentations is between about 135 degrees and about 160 degrees.

14. A method of flavoring food, comprising:
    depositing a food flavoring into a metering tray;
    capturing the food flavoring in the metering tray with a plurality of indentations disposed along an exterior axial surface of a metering roller;
    leveling the food flavoring within the plurality of indentations with a metering blade;
    dispensing the food flavoring from the plurality of indentations as the metering roller rotates beyond the metering blade; and
    displacing the food flavoring from the plurality of indentations using a displacement blade having a plurality of teeth, the plurality of teeth corresponding to the plurality of indentations.

15. The method of claim 14, further comprising:
    selecting a pattern for the plurality of indentations to control a location and volume of food flavoring dispensed.

16. The method of claim 14, further comprising:
    controlling a rotational speed of the metering roller to control a volume of food flavoring dispensed.

17. The method of claim 14, further comprising:
    controlling a pressure applied by the metering blade against the metering roller to control a volume of food flavoring dispensed.

* * * * *